(12) United States Patent
Delzenne et al.

(10) Patent No.: US 6,469,274 B1
(45) Date of Patent: Oct. 22, 2002

(54) OXYGEN ARC CUTTING WITH PLASMA PRE-HEATING OF FERROUS MATERIALS, SUCH AS STRUCTURAL STEEL WORKPIECES

(75) Inventors: Michel Delzenne, Franconville; Régis Augeraud, Lesquin, both of (FR)

(73) Assignees: La Soudure Autogene Francaise, Paris (FR); L'Air Liquide Societe Anonyme, a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/869,073
(22) PCT Filed: Dec. 3, 1999
(86) PCT No.: PCT/FR99/03002
§ 371 (c)(1),
(2), (4) Date: Jun. 22, 2001
(87) PCT Pub. No.: WO00/37207
PCT Pub. Date: Jun. 29, 2000

(30) Foreign Application Priority Data
Dec. 22, 1998 (FR) .......................................... 98 16240

(51) Int. Cl.[7] .............................................. B23K 10/00
(52) U.S. Cl. .......................... 219/121.44; 219/121.39; 219/121.59; 266/48
(58) Field of Search ....................... 219/121.39, 121.44, 219/121.51, 121.48, 121.58; 266/48–51, 77

(56) References Cited

U.S. PATENT DOCUMENTS

| | | | | |
|---|---|---|---|---|
| 3,966,504 A | * | 6/1976 | Sipek et al. | 219/121.39 |
| 4,139,757 A | * | 2/1979 | Sipek | 219/121.39 |
| 4,366,950 A | * | 1/1983 | Hamasaki | 266/49 |
| 4,389,261 A | * | 6/1983 | Donze et al. | 148/9 R |
| 4,908,070 A | * | 3/1990 | Grohmann | |
| 5,560,843 A | * | 10/1996 | Koike et al. | 219/121.48 |
| 5,801,355 A | | 9/1998 | Saio et al. | |

FOREIGN PATENT DOCUMENTS

| | | |
|---|---|---|
| DE | 25 05 655 | 8/1976 |
| EP | 0 790 756 | 8/1997 |

* cited by examiner

*Primary Examiner*—Mark Paschall
(74) *Attorney, Agent, or Firm*—Young & Thompson

(57) ABSTRACT

An installation and a method for oxygen arc cutting of a metal workpiece containing at least a ferrous material, in particular a structural steel workpiece, which consists in: pre-heating locally a priming zone of the metal workpiece to be cut by subjecting the priming zone to a plasma jet; then in producing a localized fusion and/or combustion of the ferrous material contained in the workpiece, using the plasma jet or a combination of the plasma jet and an oxidizing gas flow to obtain a perforation along the whole thickness of the metal workpiece; once the perforation has been obtained, in synchronously displacing, the plasma jet and the oxidizing gas flow along a cutting path to produce a predefined slit through the metal workpiece.

7 Claims, 2 Drawing Sheets

Figure 1B:
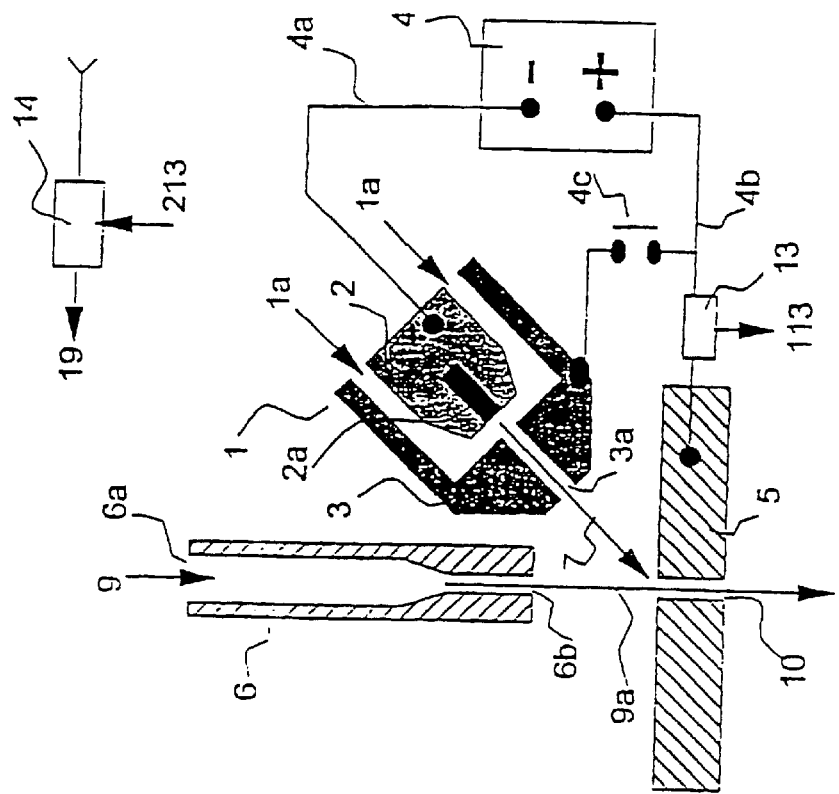

OXYGEN ARC CUTTING WITH PLASMA PRE-HEATING OF FERROUS MATERIALS, SUCH AS STRUCTURAL STEEL WORKPIECES

BACKGROUND OF INVENTION

The present invention relates to a unit and a process for cutting ferrous metals, in particular structural steels, in which the metal is locally preheated by a stream of plasma delivered by a plasma torch and the metal is cut by a stream of pressurized oxidizing gas, such as a stream of cutting oxygen, delivered by a delivery nozzle or the like.

At the present time, several processes are known for the automated thermal cutting of metals, said processes having been used for many years on an industrial scale.

By way of examples, mention may be made of oxycutting, plasma cutting and laser cutting, especially for structural steels.

These processes are based on local melting, over the entire thickness, of the material to be cut and on the displacement of the melting front in a path which defines the shape of the cut or kerf that has to be made through the material to be cut.

These various processes cannot actually be considered as competing processes as they are distinguished from one another by different cutting performance and operating and running costs.

Thus, the technique of oxycutting is known for its ability to cut on an industrial scale structural steel thicknesses ranging from 3 mm to 300 mm and to reach, in rarer applications, thicknesses possibly up to 2000 mm.

In this case, although the cost of the cutting tool, that is to say the torch, may be low, an oxycutting process has especially the drawback of being excessively slow overall.

On the other hand, plasma cutting is known for its ability to cut any type of metallic material with a very high productivity.

However, the cost of the cutting tool, namely the assembly consisting of the plasma torch and the current generator, is usually from 30 to 50 times higher than in the previous case, namely in oxycutting.

Moreover, $CO_2$ laser cutting is known to produce excellent cutting quality, particularly over thicknesses of less than 10 mm, that is to say within a thickness range in which the laser process is also productive.

In contrast, the cost of the cutting tool, namely the assembly consisting of the laser head and the $CO_2$ laser source, is, here too, 200 to 300 times higher than that in the case of oxycutting.

More generally, the oxycutting technique is based on the use of the thermal energy generated by the combustion of iron, combined with the kinetic energy of the oxygen jet which allows the oxides produced during said cutting to be expelled from the kerf.

However, the combustion of iron requires the presence of preheating flames to initiate it and then sustain it correctly.

To do this, oxycutting torches are conventionally fitted, at their lower end, with a cutting head or delivery nozzle, generally cylindrical in shape, having a central channel for delivering the cutting oxygen which is surrounded, at a certain distance away, by a ring of channels for delivering a mixture of a combustible gas and an oxidizer which are intended to form a heating or preheating flame peripheral to the central oxygen cutting jet.

An oxycutting operation may be described schematically by a cycle comprising the following steps:

(a) opening, by an operator, of the combustible-gas and oxidizer taps so that these gases are fed into the heating orifices of the cutting head;

(b) ignition of the cutting torch, either manually by means of, for example, a lighter flame presented at the exit of the heating orifices of the cutting head, or automatically, for example with the aid of a piezoelectric quartz crystal for creating a spark which ignites a gas pilot, whose flame thus obtained is directed toward the heating orifices of the cutting head, so as to ignite in turn the heating flame of the torch;

(c) adjustment of the combustible gas and oxidizer flow rates, by means of taps provided on the torch, so as to obtain a flame with the chosen stoichiometric ratio or corresponding to the technical requirements of the torch manufacturer;

(d) presentation of the torch at the required point of initiation on the workpiece to be cut;

(e) local heating of the workpiece to be cut until a sufficient temperature is reached, conventionally about 1300° C. in the case of a workpiece made of structural steel, in order for the iron-oxygen reaction to be able to be initiated and sustained;

(f) opening of the cutting oxygen;

(g) drilling of the workpiece over its entire thickness;

(h) movement of the torch by means of the shafts of the cutting machine and execution of the cutting in one or more programmed paths;

(i) end of the cutting operation, stopping the feed of gas to the torch in order to stop the flow of cutting oxygen and the heating or, where appropriate, cutting off the flow of cutting oxygen and continuing the heating in order to move the torch to a new point of initiation.

However, the productivity of oxycutting processes generally suffers from a low rate of propagation of the combustion front of the iron forming part of the composition of the material to be cut and also by the relatively long times to prepare for the actual cutting, that is to say the time to adjust the heating flame and the time for heating the workpiece locally in order to reach the temperature favorable to the iron oxycombustion reaction.

Thus, because of a low heating power density applied to the workpiece, the time needed to raise the material to the required temperature is generally from 5 to 20 seconds and may, in extreme cases, be as long as about 1 minute.

In addition, this heating phase followed by the initiation of the oxycombustion reaction cannot be easily automated because the time needed to reach the correct reaction initiation conditions cannot be accurately predicted.

This is because the factors that can influence this time are, especially, the mass of the workpiece, the thermal conductivity of the grade of material to be heated, the surface state of the material, that is to say for example the possible presence of millscale, grease, paint or another coating on this material, but also other factors associated with the specific heat of the gases used for heating, and their mixing ratio.

In practice, most often the operator carefully monitors the heating operation and manually opens the cutting oxygen when conditions suitable for initiating the oxycombustion reaction seem to him to be achieved.

This practice sometimes leads to ignition "failures", that is to say ineffective or imperfect ignition, because the temperature of the material is not high enough, or sometimes, on the other hand, to excessively long heating times, for safety's sake, in order to be sure that ignition will take place correctly.

Consequently, the problem which arises is to prevent or minimize ineffective or imperfect ignition and to increase the productivity of oxycutting processes by, in particular, reducing the time needed to prepare for the actual cutting operation, and preferably with effective automation of the entire process.

SUMMARY OF INVENTION

The solution proposed by the present invention relies on coupling an oxycutting process with a process for heating by means of a plasma jet or stream of plasma, and of its operating equipment.

The present invention therefore relates to a process for the plasma oxycutting of at least one metal workpiece containing at least one ferrous metal, in particular iron, in which:

(a) an ignition region of the metal workpiece to be cut is locally preheated by subjecting said ignition region to at least one plasma jet;

(b) at least part of the ignition region at least preheated in step (a) is subjected to at least one stream of oxidizing gas at a pressure of greater than $10^5$ Pa;

(c) at least one drillhole is made over the entire thickness of the workpiece to be cut, in at least part of the ignition region subjected to at least preheating by plasma jet in step (a), by melting and/or combustion of the ferrous material contained in said metal workpiece by the reaction of said ferrous material with said stream of oxidizing gas and/or said plasma jet;

(d) the plasma jet and the stream of oxidizing gas are moved in a cutting path in order to produce at least part, that it to say at least a portion, of a kerf through said workpiece by melting and/or combustion of the ferrous material contained in said metal workpiece by means of the reaction of said ferrous material with at least said stream of oxidizing gas.

Depending on the case, the process according to the invention may comprise one or more of the following characteristics:

the drillhole produced in step (c) is obtained by the reaction of the ferrous material with at least said stream of oxidizing gas. In this first case, it is essentially the stream of oxidizing gas which is used to drill the metal workpiece and the plasma jet serves, on the one hand, only to preheat the ignition region and possibly to obtain the start of melting and/or combustion of the iron contained in the material of which the metal workpiece is composed and, on the other hand, to sustain the oxidizing combustion flux;

the drillhole produced in step (c) is obtained by the reaction of the ferrous material with said plasma jet. In this second case, it is the plasma jet which is used not only to preheat the ignition region but also to drill the metal workpiece by the melting and/or combustion of the iron contained in the material of which the metal workpiece is composed and then serves, as in the first case, to sustain the oxidizing combustion flux;

the ignition region is preheated in step (a) to a temperature of between 1000° C. and 1500° C., preferably from 1200° C. to 1400° C. and even more preferably about 1300° C. to 1350° C.;

the preheating time is between 0.001 and 2 seconds, preferably between 0.01 and 1.5 seconds;

the pressure of the stream of oxidizing gas is set or adjusted depending on the thickness to be cut and/or on the heating energy generated by the plasma jet;

the flow rate of oxidizing gas is greater than 1 l/min and preferably the flow rate of the stream of oxidizing gas is set or adjusted depending on the thickness to be cut and/or the heating energy generated by the plasma jet;

the stream of oxidizing gas is oxygen or a gas mixture containing oxygen, especially air;

the melting and/or combustion of the ferrous material by the stream of oxidizing gas is localized to at least part of the ignition region;

during cutting, each portion of the cutting path is subjected to the plasma jet and to the stream of oxidizing gas, most of the melting and/or combustion of the material in said cutting path being essentially provided by the reaction of iron with the stream of oxidizing gas;

the plasma jet and the stream of oxidizing gas are delivered coaxially or convergently;

the kerf is produced by moving said plasma jet and said stream of oxidizing gas at an approximately constant cutting rate, preferably at a cutting rate which depends on the thickness to be cut, on the gas flow rate and/or on the gas pressure, for example a cutting rate of about 0.6 m/min for a steel plate having a thickness of 12 mm.

The invention also relates to a plasma-oxycutting unit that can be used to cut a metal workpiece containing at least one ferrous material, in particular iron, comprising at least:

a plasma jet preheating torch of axis (Zt—Zt) for delivering at least one plasma jet and a gas stream delivery nozzle of axis (Zb—Zb) for delivering at least one stream of gas; the axis (Zb—Zb) of said delivery nozzle and the axis (Zt—Zt) of said preheating torch both being directed toward a point of convergence such that the gas jets emanating from the nozzle and from the torch converge on said point of convergence, preferably the point of convergence lying approximately at or near the upper surface of the metal workpiece;

support-frame means supporting said plasma jet preheating torch and/or said delivery nozzle;

movement means for moving, preferably in approximate synchronism, the plasma torch and the delivery nozzle relative to the metal workpiece; and control means used for controlling at least the movement means and/or at least one operating cycle of the torch, preferably the operating cycles of the torch.

Depending on the case, the unit according to the invention may comprise one or more of the following characteristics:

one or more gas sources;

at least one electric current source;

means for supplying a coolant, for example water;

the plasma torch and the delivery nozzle are coaxial, preferably with noncoincident respective axes, or with convergent axes;

the plasma torch is of the single-flow or multiflow type, especially the dual-flow type;

the plasma torch is of the blown-arc and/or transferred-arc type;

the movement means are motorized;

it includes at least one workpiece support means for supporting and/or holding at least one metal workpiece to be worked;

it furthermore includes means for controlling the relative movements between the torch and/or the nozzle, and the workpiece to be worked;

it also includes means for feeding the workpiece to be worked and/or removing the worked workpiece, that is to say after the workpiece has been worked;

it comprises means for programming the cutting paths, means for programming the paths for transfer from one cutting program to another cutting program and/or means for programming the ignition and/or extinction sequences of the plasma-oxycutting unit.

In other words, according to the present invention, the oxyfuel "heating" means used in conventional oxycutting processes is replaced by a plasma jet "heating" means.

The plasma jet is created by an electric arc established in a stream of plasma gas between a first electrode forming part of the plasma torch and the workpiece to be heated and cut, which forms a second electrode.

For example, the electrode of the torch, or first electrode, is connected to the negative pole of a DC current source and the workpiece to be heated and cut is connected to the positive pole of said source.

Preferably, oxygen or an oxidizing gas having similar iron combustion properties is used for the stream of plasma gas.

An orifice plate or nozzle, vigorously cooled and comprising an orifice through which the stream of plasma passes and from which it is expelled, is placed in the path of the plasma arc between the cathode and the anode, so as to increase the power density deposited on the workpiece to be heated/cut, by means of a constriction of the plasma arc through said orifice.

The power of the plasma arc is adjusted so that the material to be heated/cut is locally and rapidly raised to a temperature close to the melting point, that is to say about 1300 ° C., without thereby being melted through the depth by the impingement of a plasma jet which would be too energetic.

Next, when the temperature of the ferrous material locally reaches a temperature close to the melting point of said material, an oxygen jet is sent onto the region thus preheated so as to initiate the iron oxycombustion reaction.

As in the case of a conventional oxycutting process, this iron combustion reaction, which is highly exothermic in nature, therefore causes progressive melting and combustion of the material, right through its thickness, with the formation of a kerf by the expulsion of the molten material due to the blowing effect created by the kinetic energy of the pressurized oxygen jet and to do so in a predetermined cutting path corresponding to the movement of the oxycutting torch, preferably at a uniform and appropriate rate.

It will be immediately understood that with a heating means whose temperature may reach 20,000 K in the core of the plasma jet and whose power density is temperature from ambient temperature up to about 1300° C. is much shorter than with an oxyfuel flame whose flame temperature is only about 3275 K (in the case of an oxyacetylene flame) and whose power density, at impingement on the workpiece, is only about 2 kW/cm$^2$.

Thus, the necessary heating time, before initiation, is from 5 to 20 seconds with an oxyfuel flame whereas it is reduced to about 1/10th of a second when preheating using a plasma arc according to the present invention.

In addition, under optimum conditions for using the plasma preheating jet, this heating time is not influenced very much by the mass, the grade and the surface state of the ferrous material to be heated and cut, which therefore allows relatively easy automatic management of all the work phases resulting in the final cutting of the workpieces.

The power of the plasma jet may also be varied depending on the work phase; for example, the power may be higher during the heating and initiation phase than in the cutting phase.

To vary this power, all that is required is to control the current source supplying the torch, for example by means of a microprocessor, so that the intensity of the current delivered into the plasma arc is adjusted according to the requirements of the current phase of the cycle.

Likewise, the pressure and/or flow rate of the plasma gas may be adjusted in the same phases.

All these parameter adjustments may be preprogrammed, especially when setting up the cutting program, including the workpiece geometries, the points or moments of initiation and/or completion of the process, the cutting speeds, etc.

This preprogramming may be carried out directly via a computerized numerical control (CNC) tailored to the control of the cutting machine or by any other off-line programming means.

COMPARATIVE EXAMPLE

This comparative example illustrates the increase in productivity that may result from the oxycutting process with plasma jet preheating according to the invention over a conventional oxycutting process with no plasma jet preheating.

An identical test piece is cut from a structural steel of the E24 type, having a thickness of 20 mm, by carrying out each of the abovementioned processes.

Each time, the cutting operation consists in cutting 25 disks 20 mm in diameter within these test piece and of one perimeter equal to about 1.5 meters around said 25 disks.

In other words, the cutting operation is composed of the cutting of:

25 disks, i.e. 25 initiations and a cutting length of about 25×0.063 m; and 1 perimeter of the test piece, i.e. 1 initiation and a cutting length of about 1.5 m.

The cutting operation therefore comprises, in total: 26 initiations and a cutting length of about 3 m.

Admittedly, to allow easier comparison, the cutting speed used is the same in the tests for implementing a conventional oxycutting process and in tests for implementing a plasma-oxycutting process according to the present invention: in both cases, the cutting speed is 0.6 m/min.

However, it should be emphasized that, when implementing a plasma-oxycutting process according to the present invention, the heating of the oxygen cutting jet near the plasma jet may, in certain cases, allow higher cutting speeds than in conventional oxycutting, that is to say in the case of an oxyfuel flame.

In addition, another factor liable to increase the cutting speed stems from the heat concentration, upon impingement of the plasma jet on the workpiece, limiting the lateral expansion of the iron combustion region and producing narrower kerf widths than in conventional flame oxycutting.

Furthermore, within the context of the tests carried out here, the total cutting time, excluding the time for transferring from one cutting operation to the next, is the same for both types of processes tested, namely 5 min 13 s.

The results obtained are given in the following table.

TABLE

| Cutting process | Initiation time | Cutting time | Total time |
| --- | --- | --- | --- |
| Oxycutting (prior art) | 5 min 24 s | 5 min 13 s | 10 min 37 s |
| Oxycutting with plasma preheating (invention) | 3 s | 5 min 13 s | 5 min 16 s |

From the above table it may be seen that the oxycutting process with plasma preheating according to the invention makes it possible to achieve a time saving of about 5 min 21 s over an oxycutting process according to the prior art.

In other words, a plasma-oxycutting process according to the invention makes it possible to cut twice the number of metal workpieces than a conventional oxycutting process in the same time.

The invention will now be described in greater detail with the aid of examples of embodiments shown schematically in the appended figures, which are given by way of illustration but imply no limitation.

Figure 1A:
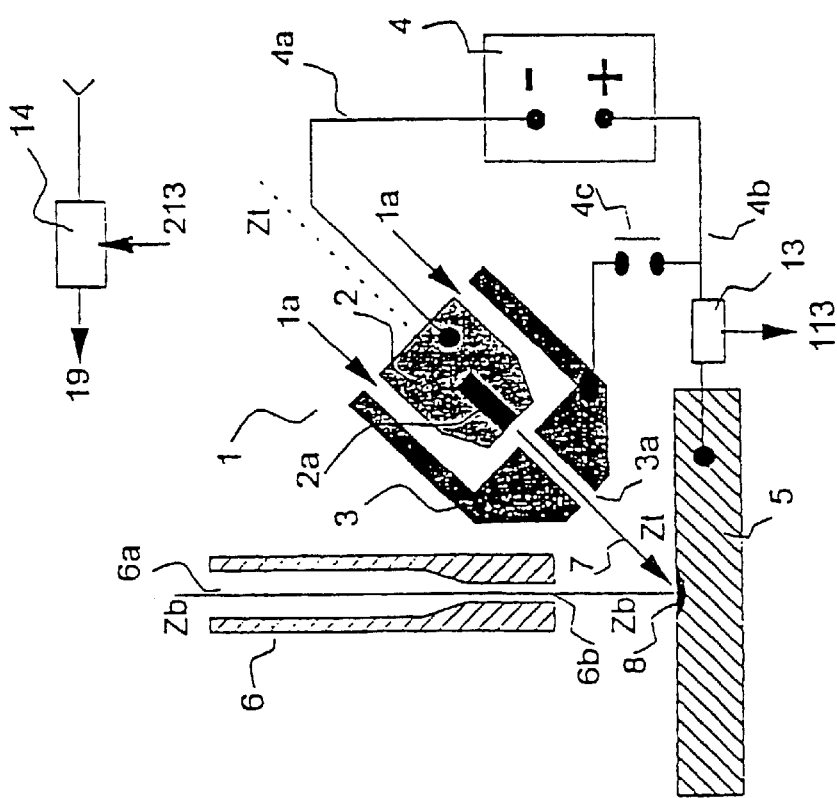

FIG. 1a shows a diagram of a first embodiment of a unit according to the invention of the type with convergent jets.

More specifically, figure la shows a plasma jet preheating torch 1 comprising an electrode 2 and a nozzle 3.

The electrode 2, of axisymmetric overall shape, is made of copper or a copper alloy and is provided at its downstream end with an emissive element 2a made, for example, of hafnium or a hafnium alloy.

Moreover, the nozzle 3, also of axisymmetric overall shape, is made of copper or a copper alloy and is provided with a calibrated orifice 3a for expelling the stream of plasma.

The axis of the orifice 3a is coaxial with the axis of the electrode 2 and of the emissive insert 2a.

Furthermore, said orifice 3a may include profiled structures, especially a structure of the convergent/calibrated neck/divergent type.

A circular section 1a bounded, on the one hand, by the outer wall of the electrode 2 and, on the other hand, by the inner wall of the nozzle 3 forms a passage for injecting a gas, called the plasma gas, chosen from oxidizing gases, preferably oxygen.

A space is provided between the downstream end of the electrode 2 carrying the emissive insert 2a and the bottom of the nozzle 3 in order to allow the stream of gas to flow out via the orifice 3a of the nozzle 3.

Furthermore, a DC current source 4, such as a current generator, is connected, on the one hand, via its negative pole (−) and by means of an electrical cable 4a to the electrode 2 forming the cathode in the torch 1 and, on the other hand, via its positive pole (+) and by means of an electrical cable 4b to the metal workpiece 5 to be heated and cut, forming the anode.

An additional electrical link is made between the line 4b and the nozzle 3 via an electrical contact means 4c, for example an electrical switch.

In a transient phase for igniting the plasma torch 1, the contact 4c is closed, thus setting the nozzle 3 at the positive potential of the source 4 and therefore allowing ignition of a first arc, called a pilot arc, established between the electrode 2, 2a and the nozzle 3.

Conventional pilot-arc initiation means, such as a high-frequency auxiliary source or a device for temporarily short-circuiting the electrode 2 and the nozzle 3 (neither being shown in FIG. 1a) are used to initiate this pilot arc.

In order not to damage the channel of the orifice 3a of the nozzle 3, a nonoxidizing gas such as argon is preferably injected and this flows through the space la during the phase of igniting the torch 1, that is to say until the electric arc has been effectively transferred to the metal workpiece 5.

The plasma torch 1 of axis (Zt—Zt) is placed obliquely with respect to the upper plane of the workpiece 5 so that the axis of the plasma jet 7 emanating from the orifice 3a converges on a point or area on the upper plane of the workpiece 5, with the axis (Zb—Zb) of a nozzle 6 placed nearby and in a direction perpendicular to said upper plane of the workpiece 5.

The axes (Zt—Zt) and (Zb—Zb) may advantageously be each motor-driven and slaved to sensing systems allowing the torch 1 and the nozzle 6 to be maintained at substantially constant respective distances from the upper plane of the workpiece 5.

The nozzle 6, which may be made of a metallic and/or nonmetallic material, such as a ceramic, has at its upper end a first orifice 6a which is fed with an oxidizing gas, preferably oxygen, and is in coaxial communication with a second calibrating orifice 6b having a smaller diameter than the first orifice and emerging at the downstream end of the nozzle 6.

Furthermore, said orifice 6b may also include profiled structures, especially a structure of the convergent/calibrated neck/divergent type.

The plasma torch 1 and the oxygen nozzle 6 may be two subassemblies independent of each other or integrated into a single piece by mechanical assembly.

The operation of the unit in FIG. 1a may be entirely automated.

Such an automated unit. then comprises a torch/nozzle assembly in which the plasma torch 1 is dedicated to preheating the material and the nozzle 6 forming the cutting head is dedicated to cutting the material.

Furthermore, an automated unit also comprises:

at least one shaft provided with at least one actuator (neither being shown) for moving the torch/nozzle assembly and for moving peripheral members in the X and/or Y directions, allowing a preprogrammed cutting path to be described;

a shaft provided with a movement actuator, supporting the torch/nozzle assembly, for vertical movement along the axis (Zb—Zb) in order to be able to adjust the distance separating the torch/nozzle assembly from the upper surface of the workpiece 5 to be heated and cut, so that the point of convergence of the gas jets emanating from the nozzle 6 and from the torch 1 is continuously changing in a plane approximately coincident with the plane formed by the upper surface of the workpiece to be heated and cut;

a shaft provided with a movement actuator, supporting the torch 1, so as to move obliquely along the axis (Zt—Zt) in order to adjust the length of the plasma jet 7 from the end face of the nozzle 3 to the point of convergence of the jets emanating from the nozzle 6 and from the torch 1;

a controller (not shown) comprising means for programming the movements of the shafts in terms of position and speed, the points of initiation and completion of the cutting process, for example a numerical control, and means for automatically managing the sequences for operating the torch/nozzle assembly, the members for selecting the fluids and for controlling the current source, various timers, etc.

The ignition of the plasma torch shown in FIG. 1 takes place in the following manner.

Voltage is supplied to the current source 4, the contact 4c is closed and a plasma gas, such as argon, is injected at a suitable pressure into the space 1a in the torch 1. An auxiliary high-voltage high-frequency source (not shown) is then energized, creating a spark between the end of the electrode 2, 2a and the bottom of the nozzle 3.

Alternatively, it is possible to electrically contact the electrode and the nozzle, that is to say to short-circuit these components by making them undergo a relative movement so as to touch each other and then to separate them by moving them in the opposite direction. Upon breaking the short circuit, a spark is created between the end of the electrode 2, 2a and the bottom of the nozzle 3.

In all cases, the electrical path formed by the spark thus obtained causes partial and local ionization of the gas between the electrode 2 and the nozzle 3, thereby allowing flow of current and the formation of an electric arc, the cathode and anode roots of which, owing to the dynamic pressure of the plasma gas flow, rapidly become fixed, in the first case, at the center of the end of the emissive insert 2a and, in the case of the second, at a point on the lateral surface of the orifice 3a of the nozzle 3.

A stable plasma arc called a pilot arc is then established, forming a fine jet of partially ionized gas at a high temperature, which extends outside the orifice 3a of the nozzle 3, that is to say toward the metal workpiece 5.

Next, transfer of the electric arc to the metal workpiece 5 is observed and this workpiece 5 starts to be locally heated.

However, if the torch 1 has not yet been prepositioned, it is then moved along the axis (Zt—Zt) toward the workpiece 5 until a sufficiently ionized region of the pilot arc column is in contact with the upper surface of said workpiece 5 and an electric current flows between the electrode 2, 2a and said workpiece 5.

A detector 13, of the current relay type, placed in the additional line 4b connecting the positive pole (+) of the current source 4 to the workpiece 5, sends a signal indicating the flow of an electric current, toward the actuator for moving the torch 1 along the axis (Zt—Zt), the current source 4, the electrical auxiliaries of the current source 4 and the various members for managing the gases feeding the torch 1, and the following then occurs;

the movement of the torch 1 toward the workpiece 5 is stopped;

the contact 4c is opened;

the plasma gas is changed in order to go from the pilot gas, for example argon, to the heating gas, that is to say the oxidizing gas;

the intensity of the current is increased to a pre-established value corresponding to the heating conditions predefined by the operator working on the workpiece 5;

the workpiece 5 is heated until the temperature rises, in the region of impingement 8 of the plasma arc 7 on the workpiece 5, to a value of about 1300° C. The heating time (of the order of a few 10ths of a second) is preprogrammed in relation to the intensity of the current flowing in the plasma arc and possibly the mass of the workpiece 5.

Next, the iron combustion reaction is initiated in the workpiece 5 to be cut and a drillhole made in this workpiece 5, as shown schematically in FIG. 1b.

To do this, at the end of the preprogrammed heating time, with the plasma heating arc 7 being maintained, an order (at 213) is sent to a cut-off member 14, for example a solenoid valve placed in the line feeding the nozzle 6 with cutting oxygen, in order to open it in an on/off opening or gradual opening mode.

A flow of oxygen 19 is then sent toward the entrance 6a of the nozzle 6 thus forming a jet or stream 9a of pressurized oxygen which leaves via the calibrated orifice 6b of the nozzle 6.

The oxygen jet 9a strikes the region 8 preheated to a temperature of about 1300 ° C. and then initiates an oxidation reaction resulting in the combustion of the iron contained in this region 8 of the workpiece 5.

Since the combustion reaction is highly exothermic, it gradually propagates by combustion/melting of the material over the entire thickness of the workpiece 5 until the oxygen jet 9a emerges at the lower face of the workpiece 5 and flows freely via the passage 10 of approximately cylindrical overall shape thus drilled.

The drilling time is a preprogrammed parameter that takes into account, especially, the thickness of the workpiece 5 and the flow rate of the oxygen jet 9a.

At the end of the preprogrammed drilling time, an order is delivered to the X-axis and/or Y-axis actuators via the controller, so as to follow a preprogrammed cutting path.

The oxidation reaction then propagates radially, over the entire thickness of the workpiece, with respect to the oxygen jet and forms an approximately semicylindrical kerf front.

The speed of movement of the torch/nozzle assembly is kept approximately constant over the cutting time and is chosen so that a steady state is achieved between the production of molten material and its expulsion from the kerf, from the lower surface of the workpiece, owing to the pressure of the cutting gas.

During the movement of the torch/nozzle assembly, a sensing system, which ensures that the point of convergence of the oxygen jet 9a and plasma jet 7 is maintained in the upper plane of the workpiece 5 being cut, is actuated.

In roughly the same space of time, an order may be delivered to the current source 4 in order to reduce the intensity of the current in the plasma arc and bring it to a minimum value sufficient to sustain the oxidation reaction in the kerf.

After the workpiece has been cut, that is to say at the end of the execution of the program, the controller simultaneously delivers an order to stop the X-axis and/or Y-axis movements, an order to the current source 4 to cut the current supplying the plasma torch 1, an order to close the member 14 for cutting off the flow of cutting oxygen, then, with or without a delay, an order to close the member for cutting off the flow of plasma gas feeding the torch 1 and, possibly, an order to move the torch/nozzle assembly back along (Zt—Zt) by the motorized shaft.

The torch is then extinguished and cutting is therefore stopped.

Depending on the requirements, a cutting sequence may be carried out by successively positioning, by means of a program or by manual control, the torch/nozzle assembly at one or more new starting points on one or more workpieces to be cut, and by carrying out, for each of them, the sequence of steps described above.

Figure 2:
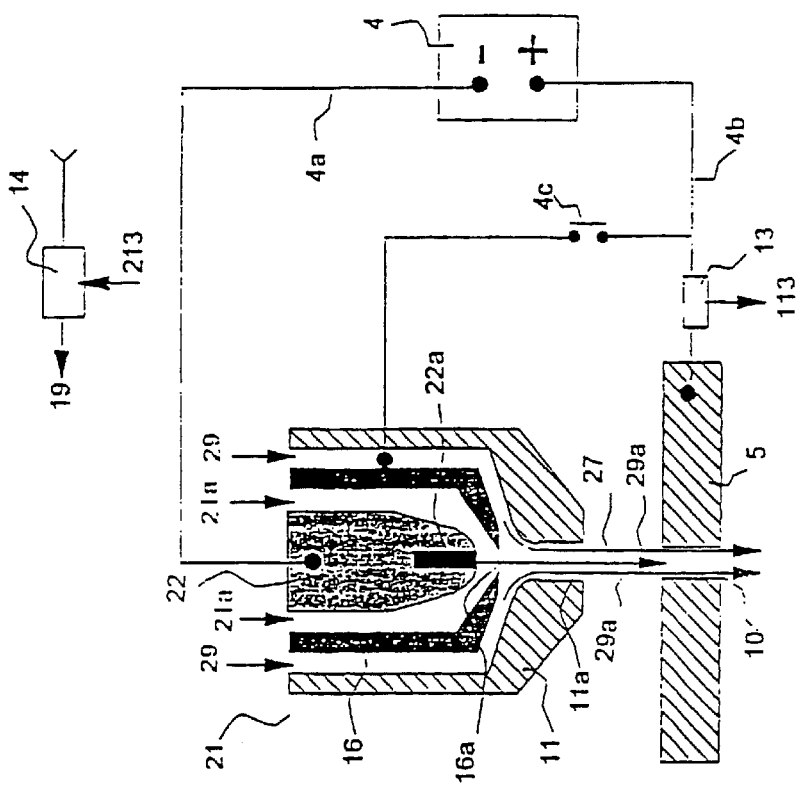

FIG. 2 shows a diagram of a second embodiment of a unit according to the invention of the type with coaxial jets.

Since the mode of operation of the unit shown in FIG. 2 is quite similar to that of the unit shown in FIGS. 1a and 1b, it will not be explained in further detail below.

However, as may be seen in FIG. 2, there is a major difference in that the plasma jet 27 and gas jet 29a do not converge on each other.

This is because a unit according to the invention of the type with coaxial jets is characterized by the coaxiality of the jets 27 and 29a and therefore by there being no need to position the point of convergence with respect to the upper plane of the workpiece 5 to be cut.

Consequently, a single shaft, having a vertical movement, provided with an actuator for moving the torch systems 21 and 31, is needed so that they are at a suitable distance from the workpiece 5 to be cut, in order to transfer the plasma arc thereto, and to ensure that this distance is kept approximately constant, by slaving to a sensing system throughout the cutting operations.

As shown in FIG. 2, a unit according to the invention of the coaxial-jet type comprises a dual-injection dual-nozzle torch 21, said torch 21 comprising:

- an electrode 22 of axisymmetric overall shape, made of copper or a copper alloy, provided at its end with an emissive element 22a made, for example, of hafnium or a hafnium alloy;
- a first nozzle 16 of axisymmetric overall shape, made of copper or a copper alloy, provided with a calibrated orifice 16a whose axis is coincident with the axis of the electrode 2 and of the emissive insert 2a. A circular section bounded, on the one hand, by the outer wall of the electrode 22 and, on the other hand, by the inner wall of the nozzle 16 forms a passage 21a for the injection of a plasma gas, preferably a gas selected from oxidizing gases, especially oxygen. A space is provided between the end of the electrode 22 and the bottom of the nozzle 16, allowing the gas to flow out via the orifice 16a of the nozzle 16;
- a second nozzle 11, of axisymmetric overall shape, made of copper or a copper alloy, and provided with a calibrated orifice 11a whose axis is coincident with the axis of the electrode 22 and of the emissive insert 22a, and with the axis of the orifice 11a of the first nozzle 16. A circular section bounded, on the one hand, by the outer wall of the first nozzle 16 and, on the other hand, by the inner wall of the second nozzle 11 forms a passage 29 for the injection of a cutting gas, preferably oxygen. A second space is left between the end of the first nozzle 16 and the bottom of the second nozzle 11 allowing the oxidizing gas to flow out via the orifice 11a of the nozzle 11. Furthermore, said orifices 16a and 11a belonging respectively to the nozzles 16 and 11, may also include profiled structures, especially a structure of the convergent/calibrated neck/divergent type;
- a DC current source 4 is, as in the previous embodiment, connected, on the one hand, via its negative pole (−) and by means of an electrical cable 4a to the electrode 22 forming the cathode in the torch 21 and, on the other hand, via its positive pole (+) and by means of an electrical cable 4b to the workpiece 5 to be heated/cut, forming the anode. An additional electrical link is made between the cable 4b and the nozzles 16 and 11, via a contact 4c. In a transient phase for igniting the plasma torch 21, the contact 4c is closed, thus putting the nozzles 16 and 11 at the positive potential of the source 4 and allowing ignition of a first arc, called the pilot arc, established between the electrode 22, 22a and the nozzle 11, or even the nozzle 16. Conventional means, such as an auxiliary high-frequency source or a device for temporarily short-circuiting the electrode 22 and the nozzle 16 (neither being shown) are used to initiate the pilot arc. In order not to damage the channel 16a of the nozzle 16 and the channel 11a of the nozzle 11, a nonoxidizing gas, such as argon, is preferably injected, at 21a, during this phase of igniting the torch until the arc has been effectively transferred to the workpiece 5.

During operation, the plasma arc heating jet 27 is sheathed by a stream of cutting oxygen 29a forming, during its movement along a predefined cutting path, a kerf 10 in the workpiece 5 by combustion/melting.

Figure 3:
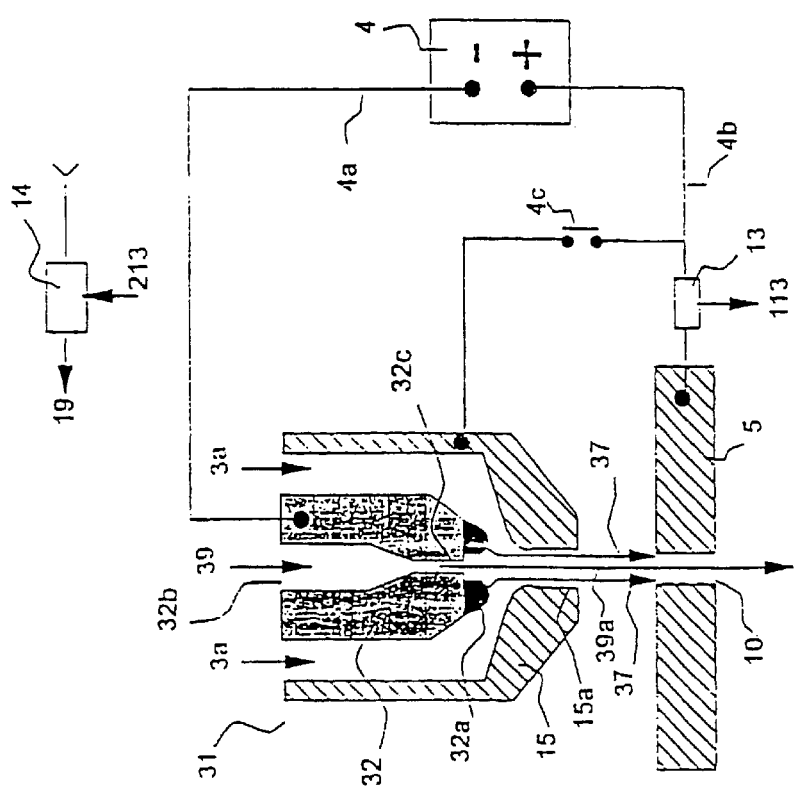

In addition, FIG. 3 shows a diagram of a third embodiment of a unit according to the invention of the dual-injection/hollow-cathode type.

As may be seen in FIG. 3, according to this embodiment the plasma torch 31 comprises:

- an electrode 32 of axisymmetric overall shape, made of copper or a copper alloy, and provided at its end with an emissive element 32a made, for example, of hafnium, a hafnium alloy or other materials and alloys of materials, which emissive element 32a has a ring shape, the axis of revolution of which coincides with the axis of the electrode 32. A first orifice 32b, for feeding with cutting gas, preferably oxygen, is made at the upper end of the electrode 32 along its axis of revolution. A second calibrated orifice 32c, of smaller cross section, is drilled in the lower part of the electrode 32 along its axis of revolution, the orifices 32b and 32c being in communication with each other via a conical bore, the large base of which has a diameter approximately equal to the diameter of the orifice 32b and the small base has a diameter approximately equal to the diameter of the orifice 32c;
- a nozzle 15, of axisymmetric overall shape, made of copper or a copper alloy, provided with a calibrated orifice 15a whose axis is in coincidence with the axis of the electrode 32 and of the emissive insert 32a. A circular cross section bounded, on the one hand, by the outer wall of the electrode 32 and, on the other hand, by the inner wall of the nozzle 15 forms a passage 31a for the injection of a plasma gas, selected from oxidizing gases, preferably oxygen. A space is left between the end of the electrode 32 and the bottom of the nozzle 15 allowing the gas to flow out via the orifice 15a of the nozzle 15. Furthermore, said orifices 32c and 15a, belonging to the electrode 32 and to the nozzle 15 respectively, may also include profiled structures, especially a structure of the convergent/calibrated neck/divergent type;
- a DC source 4 is connected, on the one hand, via its negative pole (−) and by means of an electrical cable 4a to the electrode 32 forming the cathode in the torch 31 and, on the other hand, via its positive pole (+) and by means of an electrical cable 4b to the workpiece 5 to be heated/cut, forming the anode. An additional electrical link is made between the line 4b and the nozzle 15, via a contact 4c. In a transient phase of igniting the plasma torch 31, the contact 4c is closed, thus putting the nozzle 15 at the positive potential of the source 4 and thus allowing a pilot arc to be ignited between the electrode 32, 32a and the nozzle 15. As previously, conventional means are used to initiate this pilot arc.

Likewise, in order not to damage the channel 15a of the nozzle 15, a nonoxidizing gas, such as argon, is preferably injected during this phase of igniting the torch until the arc has been effectively transferred to the workpiece 5.

In this case, during operation, the stream of cutting oxygen 39a is sheathed by the plasma jet 37 and forms, by combustion/melting, a kerf 10 in the workpiece 5 along a desired path.

It goes without saying that the torches 1, 21 and 31 and possibly the nozzle 6, which are described above and shown in FIGS. 1a, 1b, 2 and 3, include internal structures, not shown here, allowing the flow of a coolant, such as demineralized water, so as to provide effective cooling, in particular, of the electrodes and the nozzles, by forced convection, that is to say by heat exchange.

A unit according to the present invention may be applied to the production of straight cuts or cuts of more complex shapes in flat sheets or plates, or in volumes, especially volumes made from flat sheets or plates welded together or formed by deformation, the chemical composition of which makes them similar to structural steels.

Depending on the case, the automatic cutting unit according to the invention may be of the X-Y type, X-Y-Z type or an automated robot.

However, the cutting unit may also be of the manual type, that is to say, in this case, the torch is held in the operator's hand.

Such a unit can be used to make cuts with straight or beveled edges, especially for the production of mechanical assemblies or welded assemblies.

It should also be emphasized that, although in the foregoing the oxycutting process using a plasma arc torch according to the invention is described as a process for cutting structural steels, with higher productivity than in conventional oxycutting with oxyfuel heating, this process can also, within the same fields of application, be regarded as an oxygen plasma cutting process of low electrical energy.

This is because, in a conventional oxygen plasma cutting process, which operates mainly by melting the material, over its entire thickness, due to the thermal effect of the plasma arc and the expulsion of the molten material owing to the kinetic effect of the plasma gas jet, the main heat source comes from the electron flux delivered to the anode, that is to say the workpiece to be cut.

In other words, it is mainly the intensity of the current in the plasma arc which determines the cutting capacity.

In the plasma arc oxycutting process according to the invention, the plasma arc serves only to heat the surface of the workpiece to be cut during the ignition sequence preceding the iron combustion reaction owing to the effect of the cutting oxygen jet, and then serves as a heat supply source for sustaining this reaction throughout the duration of the cutting process, the main heat source being created by the exothermic iron oxidation reaction.

By way of nonlimiting example, the intensity (in amperes) of the arc current needed for cutting an E24 steel plate having a thickness of 12 mm is 120 A by using conventional cutting by a jet of an oxidizing plasma, but only 30 A by using the plasma-oxycutting according to the invention.

However, it is known that, in the conventional oxygen plasma cutting process, the intensity of the arc current is one of the major factors in the wear of the cathodes, which are generally made of hafnium.

In the current state of the art, and for these reasons, the currents used on an industrial scale do not exceed 250 to 300 A, allowing structural steel thicknesses of about 30 mm to be cut.

The plasma oxycutting process according to the invention therefore makes it possible to achieve very markedly greater cut thicknesses and to do so without thereby exceeding the present current intensity limits, that is to say by maintaining the acceptable cathode lifetimes or, conversely, allowing smaller thicknesses to be cut with very much lower arc current intensities than those needed for the conventional oxygen plasma cutting processes and therefore obtaining much longer cathode lifetimes.

What is claimed is:

1. A process for the plasma oxycutting of at least one metal workpiece containing at least one ferrous metal, in particular iron, in which:
   (a) an ignition region of the metal workpiece to be cut is locally preheated by subjecting said ignition region to at least one plasma jet;
   (b) at least part of the ignition region at least preheated in step (a) is subjected to at least one stream of oxidizing gas at a pressure of greater than $10^5$ Pa;
   (c) at least one drillhole is made over the entire thickness of the workpiece to be cut, in at least part of the ignition region subjected to at least preheating by plasma jet in step (a), by melting and/or combustion of the ferrous material contained in said metal workpiece by the reaction of said ferrous material with said stream of oxidizing gas and/or said plasma jet;
   (d) the plasma jet and the stream of oxidizing gas are moved in a cutting path in order to produce at least a portion of a kerf through said workpiece by melting and/or combustion of the ferrous material contained in said metal workpiece by means of the reaction of said ferrous material with at least said stream of oxidizing gas; and
   (e) the ignition region is preheated in step (a) to a temperature of between 1000° C. and 1500° C., preferably from 1200° C. to 1400° C. and even more preferably about 1300° C. to 1350° C. and/or in that the preheating time is between 0.001 and 2 seconds, preferably between 0.01 and 1.5 seconds.

2. The process as claimed in claim 1, characterized in that the drillhole produced in step (c) is obtained by the reaction of said ferrous material with at least said stream of oxidizing gas.

3. The process as claimed in claim 1, characterized in that the drillhole produced in step (c) is obtained by the reaction of said ferrous material with said plasma jet.

4. The process as claimed in claim 1, characterized in that the stream of oxidizing gas is oxygen or a gas mixture containing oxygen, especially air or oxygen-enriched air.

5. The process as claimed in claim 1, characterized in that, during cutting, each portion of the cutting path is subjected to the plasma jet and to the stream of oxidizing gas, most of the melting and/or combustion of the material in said cutting path being essentially provided by the reaction of iron with the stream of oxidizing gas.

6. The process as claimed in claim 1, characterized in that the plasma jet and the stream of oxidizing gas are delivered coaxially or convergently.

7. The process as claimed in claim 1, characterized in that the kerf is produced by moving said plasma jet and said stream of oxidizing gas at an approximately constant cutting rate, relative to the metal workpiece.

* * * * *